July 28, 1931.  H. R. STANFORD  1,816,095
APPARATUS FOR THE CONSERVATION OF SHORE LINE
AND THE DEFLECTION OF CURRENTS OF WATER
Filed Jan. 2, 1930  4 Sheets-Sheet 1
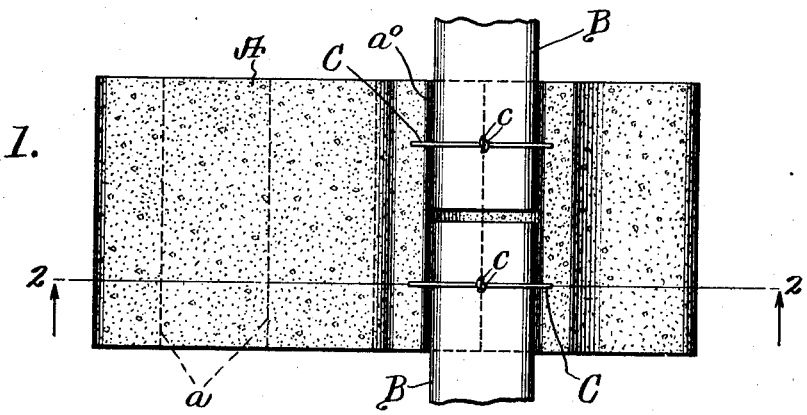
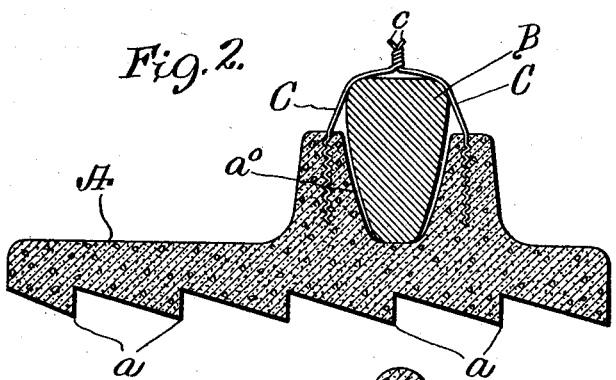
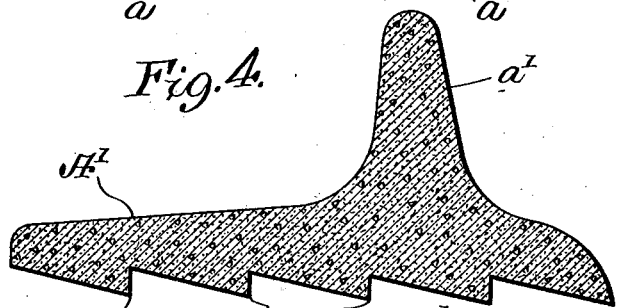
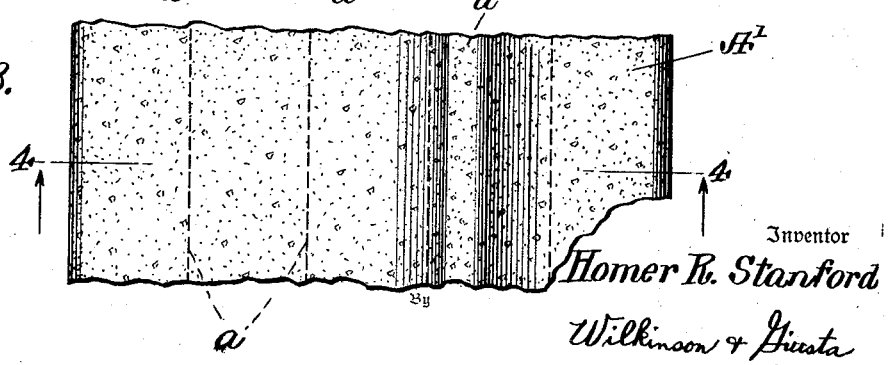
Inventor
Homer R. Stanford
By Wilkinson & Fiusta
Attorneys.

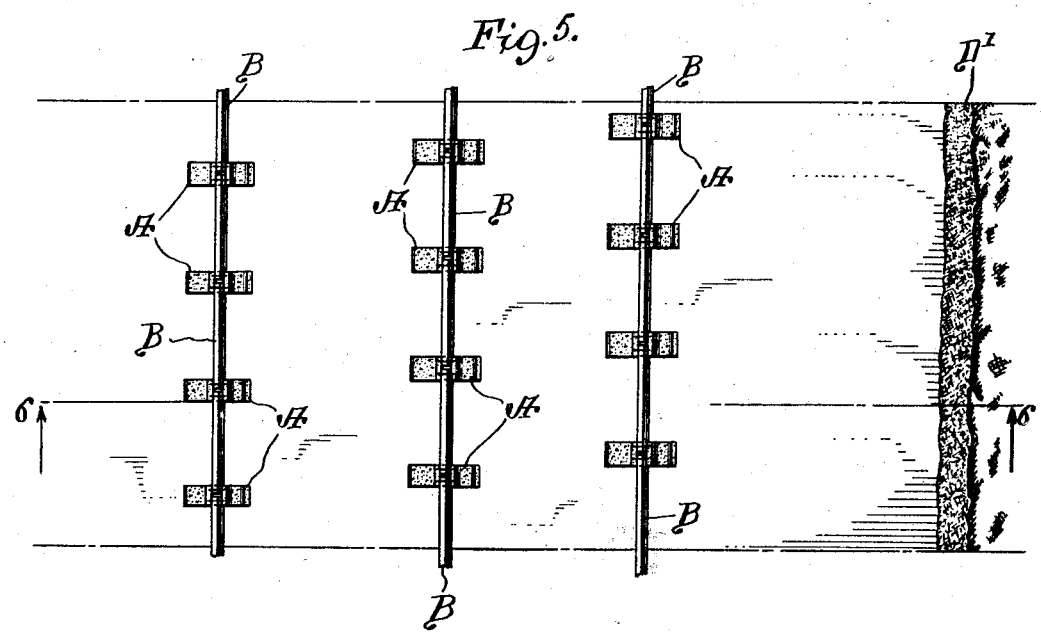
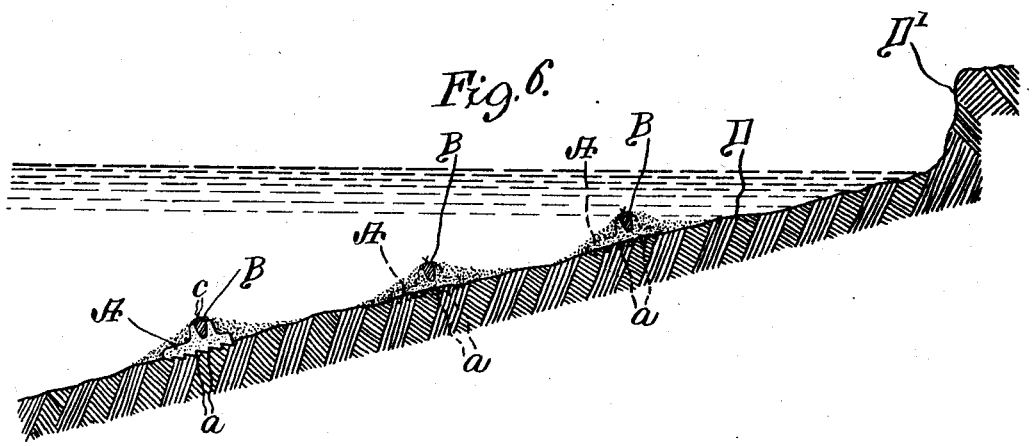
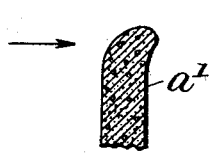 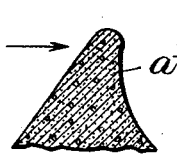 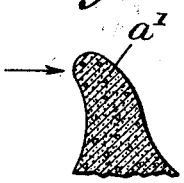 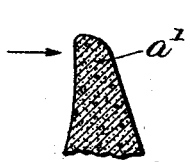

Inventor
Homer R. Stanford
By
Wilkinson & Giusta
Attorneys.

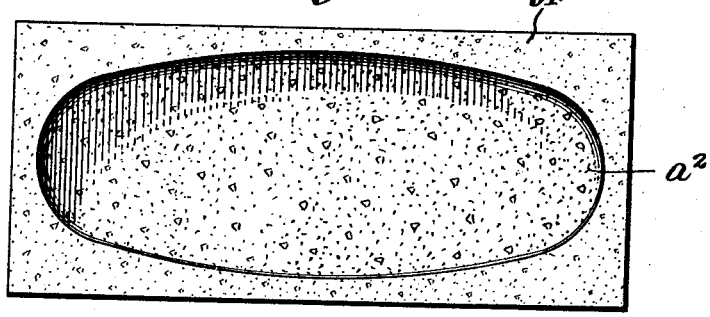
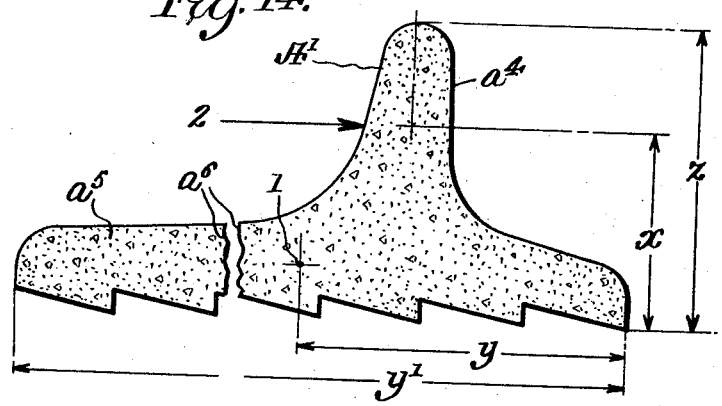
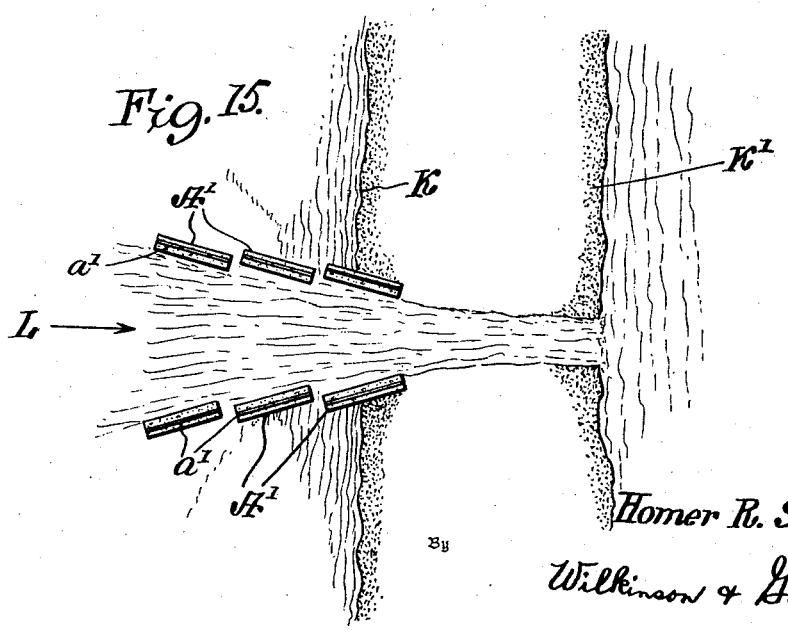

Patented July 28, 1931

1,816,095

UNITED STATES PATENT OFFICE

HOMER REED STANFORD, OF WASHINGTON, DISTRICT OF COLUMBIA

APPARATUS FOR THE CONSERVATION OF SHORE LINE AND THE DEFLECTION OF CURRENTS OF WATER

Application filed January 2, 1930. Serial No. 418,093.

Beach erosion is usually the result of heavy wave action or strong currents induced by storm. The shore line may yield due to the direct impact of waves, or by the material in a soft or sandy beach being first raised into suspension, then transported outward by receding waters.

Deposits and erosions in the beds of streams result from currents which are more or less subject to control with corresponding changes in their influence upon the bottom and side banks.

The method usually followed to resist the action of waves and currents is the building of fixed and rigid constructions designed to take the full force of impact and which once placed do not readily permit of change or modification in their details.

The problem involved in combating the forces of waves and currents is one of almost infinite variety, depending as it does upon the local conditions at the place in question. It is affected by many variable factors, such as the contour of the coastline, the profile of the beach, the depth of water, the directions of the waves with respect to the shore line, variations in wave direction depending upon the seasons and storms, and the character of the bottom and beach materials.

My present invention is intended to provide a cheap, simple and efficient apparatus for the conservation of shore line, the deflection of currents of water, and create the scouring or filling tendency which may be especially adapted to local conditions, and which may be varied from time to time according to such conditions as may be experienced or developed.

Figure 11:
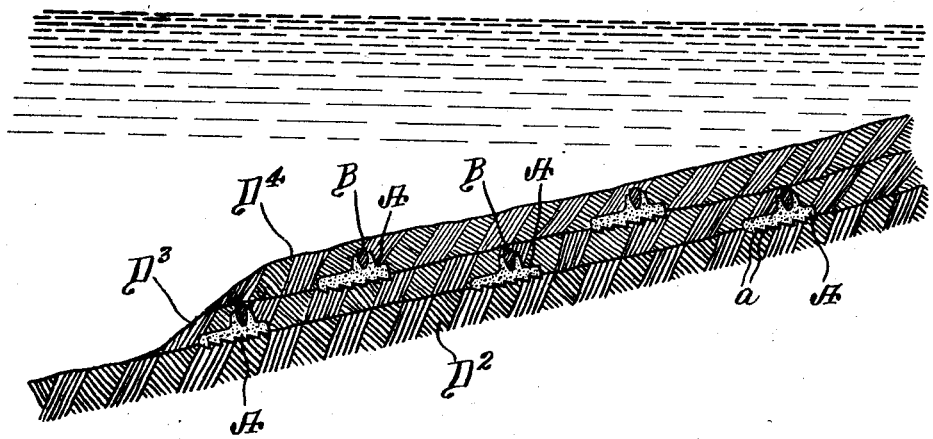
Figure 12:
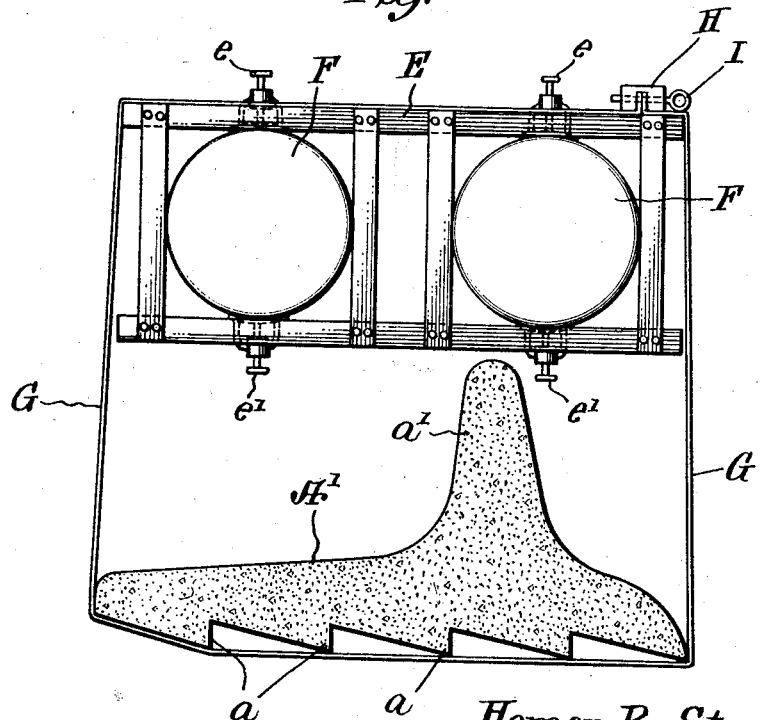

My invention will be more fully understood after reference to the accompanying drawings in which like parts are indicated by similar reference symbols throughout the several views, and in which Figure 1 is a plan view of an anchor block and two of the stop bars connected thereto to utilize a two-part unit, Figure 2 is a section along the line 2—2 of Figure 1, looking in the direction of the arrows, Figure 3 shows a portion of a one-part unit, Figure 4 shows a section along the line 4—4 of Figure 3, looking in the direction of the arrows, Figure 5 shows an arrangement of two-part units of type shown in Figures 1 and 2, used in protecting a beach, Figure 6 shows a section along the line 6—6 of Figure 5, looking in the direction of the arrows, Figures 7, 8, 9 and 10 indicate different sections of fins, or upstanding portion, of the one-part unit which may be selected to meet special conditions as hereinafter described, Figure 11 shows a section through a beach, where it is desired to provide a series of layers of deposit, as will be hereinafter described, Figure 12 shows a method for transporting and placing a one-part unit in a convenient way, Figure 13 is an inverted plan view of a modified form of anchor block, such as might be used to protect flat, muddy banks, Figure 14 is a sectional elevation of a one-part unit, illustrating diagrammatically the forces acting on the same, Figure 15 shows a series of units used like jetties to secure or maintain a channel through sand bars or the like.

Referring first to Figure 1, A represents a two-part unit comprising an anchor block and two connecting stop bars which block may be either plain concrete or preferably reinforced in the usual way.

The anchor block may be provided on its lower face with teeth $a$, so set as to engage in the bottom of the beach in the preferred direction, as for instance towards the land side, so that the waves beating on the units may not tend to push the units inward. The positions may be reversed if the conditions require it.

The anchor block, shown in Figures 1 and 2, is provided with a transverse groove $a^0$, in which the ends of the stop bars B may be mounted.

These stop bars may preferably be held in place by wires C, having their lower ends embedded in the concrete block A, and their upper ends connected together as shown at c.

These stop bars may be made of wood concrete or other suitable material, and may be held in place either by wires C, or in any other convenient way.

In Figures 3 and 4, I have shown a one-part unit A′, in which the upwardly projecting fin a′ constitutes the stop bar element and is integral with the base or anchor.

Figures 5 and 6 show two part units arranged to prevent the erosion of a beach D near the shore line D′.

The anchor blocks rest on the beach, and tend to settle therein, and the stop bars tend to break the force of the waves and create scouring or filling tendency as may be desired.

The height and form of the stop bars, the distance between anchor blocks, and the number and arrangement of the units may be varied to suit the local conditions, the waves, the amount of wash or fill, etc.

Instead of having the one-part unit, with the upstanding fin, as shown in Figures 3 and 4, various types of fins may be provided, as best suited to create a desired tendency to erosion or filling, as shown in Figures 7 to 10. In each of Figures 7–10, the arrows indicate the direction of the waves striking the fins.

Sometimes it is desirable to provide for a series of fillings on a beach, and this may be done by using two or more series of units, as shown in Figure 11, where $D^2$ is the original shore line, filled in at $D^3$, and again at $D^4$.

If desired the units may be left in place or pulled out and used over again as filling progresses.

Where the unit is heavy or to be used in deep water, it may be provided with a convenient float for transporting same to the place of use, and placing, as shown in Figure 12, in which E represents a frame carrying the air tanks F, which tanks may be emptied of air by means of the valves e, and filled or partly filled with water by the valves e′.

The anchor block may be held in place beneath this float by means of the straps or chains G, which may be unloosened in any convenient way, as by the pins I.

The free ends of the straps G are held in place by the studs H, and through these studs and straps are inserted the pins I. By pulling out the pins I, the straps can be readily disassembled when the anchor block rests on the bottom, and the float may be removed and used over again.

In Figure 13, I have shown a unit $A^2$ having in the bottom an elliptical recess $a^2$, which may be used on flat bottoms, or muddy flats.

Obviously the shape of the bottom of the anchor block, and also the top, may be varied to suit requirements.

In Figure 14, I have illustrated the normal effect of the waves on one the anchor blocks. Let 1 be the center of gravity of the block and the parts carried thereby, and suppose the center of the wave force to be acting in the way of the arrow indicated at 2 on the fin $a^1$ at the top of the block. Then the weight of the mass multiplied by the line $y$ must be greater than the force of the waves multiplied by the line $x$.

In order to secure the desired result, the height of the mass indicated by the line $z$ may be adjusted, or, if the force of the waves is too great, the length of the portion of the base $a^5$, as indicated in the broken lines $a^6$, may be extended.

Thus the total length of the block may be varied to suit required conditions, as indicated by the line $y'$.

Obviously, the units may be made of the desired form or shape before being placed in position, and as a general rule, the material of the beach will furnish the required sand and gravel thus simplifying the problem of transportation.

Obviously also the shape of the upstanding portion of the unit may be especially adapted to suit local conditions, as sometimes it is desired to provide for wash, and at other times for filling, and subject to varying conditions of wave force and beach. Such conditions for instance are illustrated in Figures 6, 7, 8, 9, and 10 of the drawings.

While in a number of the various figures, I have shown units of the one-part or two-part types, the illustrations might equally well have indicated either type, actual selection being dependent upon the actual conditions at the place in question.

In the construction shown in Figure 15, I have shown units of the character previously described used either to create or to maintain a cutting in the sandbar or earthbanks, whereby a channel for boating or other purposes may be maintained. Thus a number of the units A are placed in the form of a wedge over a sandbar K, and the current of the water on the ebb is led between these units as indicated by the arrow L.

In operation, these units will form jetties, and the rush of water through these jetties will tend to either cut or maintain a channel through the sandbar K or the beach K′.

In the manufacture of the blocks, it will be evident that any desired form of bottom or side elevation, or section, or plan may be adopted, depending upon local conditions, and I do not intend to limit the invention to any specific details, or to any particular form of manufacture of the blocks.

It will be obvious that various changes might be made in the construction, combination and arrangement of parts, which could be used without departing from the spirit of my invention, and I do not mean to limit my invention to such details, except as particularly pointed out in the claims.

It will be seen that the herein described structural arrangement, and apparatus provides a series of separate breaks for the water as it flows inward against the obstruction, thereby gradually lessening the energy or force of the water, and frittering it away instead of bringing it to a sudden shock, as would occur if the water struck a solid stone wall.

Another advantage of the invention is its great flexibility. The units may be separated as far apart as desired, or arranged in any desired position, or even if once in place and used for a time, they may be shifted to some other position, without disturbing permanent construction, or requiring additional replacement units.

A further advantage of the herein described construction is that it provides for taking care of either erosion or scour, or conversely fill, and the apparatus may be arranged to effect either purpose, depending upon the arrangement of the units, and depending also upon the local conditions, which it is arranged to cure.

Having thus described my invention, what I claim and desire to secure by Letters Patent of the United States is:—

1. A break water arrangement comprising a series of anchor blocks having broad bases adapted to rest on the bottom of the beach or shore, and grooved longitudinal fins projecting upwardly from the tops of said blocks, with longitudinally disposed stop bars fitting in said grooves in said fins and secured to said blocks.

2. A break water arrangement comprising a series of anchor blocks having broad longitudinally dentated bases adapted to rest on the bottom of the beach or shore, and grooved longitudinal fins projecting upwardly from the tops of said blocks, with longitudinally disposed stop bars fitting in said grooves in said fins and secured to said blocks.

3. A break water arrangement comprising a series of reinforced concrete anchor blocks having broad bases adapted to rest on the bottom of the beach or shore, and grooved longitudinal fins projecting upwardly from the tops of said blocks, with longitudinally disposed wooden stop bars fitting in said grooves in said fins and secured to said blocks.

4. A break water arrangement comprising a series of reinforced concrete anchor blocks having broad longitudinally dentated bases adapted to rest on the bottom of the beach or shore, and grooved longitudinal fins projecting upwardly from the tops of said blocks, with longitudinally disposed stop bars fitting in said grooves in said fins and secured to said blocks.

5. A block for use in a breakwater arrangement comprising a body portion with a base adapted to engage the bottom of the beach or shore line and a grooved fin projecting upwardly from the block.

6. A breakwater arrangement comprising a series of blocks having bases adapted to rest on the bottom of the beach, grooved fins projecting upwardly from said blocks, and bars fitted in said grooves.

HOMER R. STANFORD.